Patented Jan. 16, 1923.

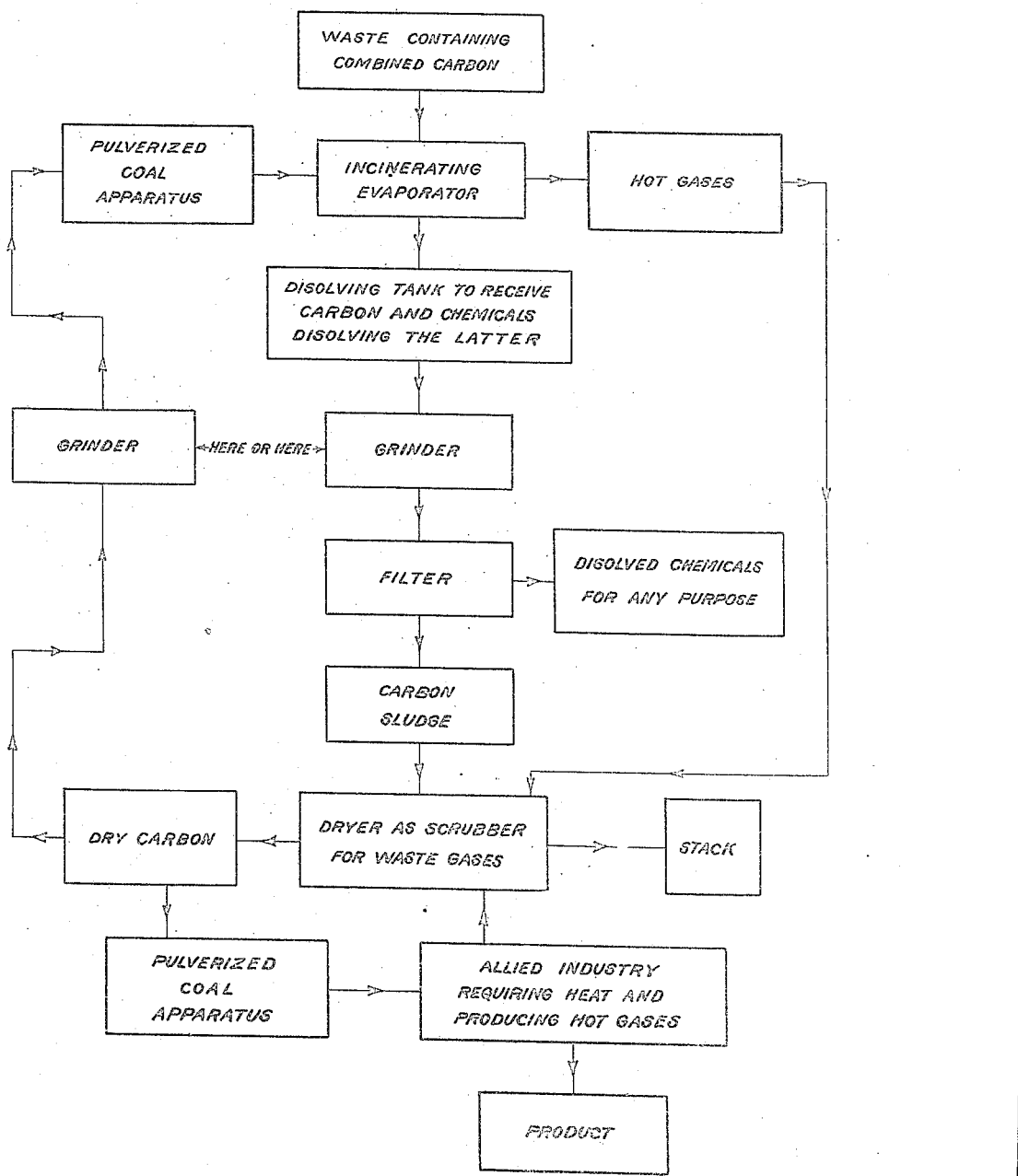

1,442,494

UNITED STATES PATENT OFFICE.

JOSEPH E. PLUMSTEAD, OF WILMINGTON, DELAWARE, ASSIGNOR TO THE JESSUP & MOORE PAPER CO., OF PHILADELPHIA, PENNSYLVANIA, A CORPORATION OF MASSACHUSETTS.

PROCESS FOR THE TREATMENT OF LIQUID WASTE MATERIAL CONTAINING COMBINED CARBON.

Application filed December 16, 1921. Serial No. 522,904.

*To all whom it may concern:*

Be it known that I, JOSEPH E. PLUMSTEAD, a citizen of the United States, and resident of Wilmington, in the county of New Castle and State of Delaware, have invented certain new and useful Improvements in Processes for the Treatment of Liquid Waste Material Containing Combined Carbon, of which the following is a specification.

My present invention relates to a process of recovering ordinarily waste products from any liquid material containing combined carbon in the form of cellulose or the like, and has particular reference to the liquid waste material from soda pulp mills in the paper industry where this material is usually disposed of as containing matter of no value.

One object of my invention is to recover from such waste material any dissolved salts present therein which may be used in the same industry producing the waste material, or disposed of as desired. Another object of my invention is to free the combined carbon in such waste material which if desired may be disposed of, but which I prefer to treat in a certain manner and utilize to recover more carbon and more dissolved salts from additional waste material.

I have illustrated diagrammatically in the drawing various steps in the process, but it is to be understood that this is merely illustrative of one satisfactory process wherein all the steps are illustrated for the sake of clearness. It may be found desirable to eliminate or add certain steps to adapt the process to various industries, and I therefore do not wish to be limited to the number or relation of steps illustrated.

The process shown in the diagram consists in passing liquid waste material containing combined carbon in varying amounts and from any industry producing such material as a waste by-product to an incinerating evaporator of any desired type. For the process in hand I prefer to use one in which a flame is the source of heat used to evaporate the liquid, said flame being in direct contact with the material being evaporated, and this portion of the process will be more fully described hereinafter.

All water, dissolved gases, and some chemicals entrained in the resulting gases being driven off in the evaporating process, part of said volatile materials to be recovered later, the solid dry material containing carbon and evaporated salts is passed from the evaporator into water or other solvent, thereby causing a separation of the salts and the carbon by dissolving the former. From this point the material may either be ground or pass to a drain or filter where the carbon is separated from the solution in the form of a sludge of varying consistency, the solute being recovered in any manner such as evaporation or otherwise as may be desired.

The carbon sludge is then passed to a suitable drying apparatus where hot gases from the evaporator are made to either contact therewith or to utilize the heat from these gases to cause the evaporation. These gases may contain products caused by the combustion reaction of the burner heating the evaporator, entrained chemicals and other materials in the gaseous form. This gas being in an extremely heated condition will readily dry the carbon of its contained moisture, the sublimated and entrained material in the gases mixing with the carbon, the moisture evaporated, the waste gases passing from the dryer to the stack.

It may be found desirable at this point to supplement the hot gases delivered to the dryer by utilizing the waste gases from other allied processes requiring heat. Any recoverable chemicals in these gases will be scrubbed out at this step.

The dry carbon may now be ground if this operation has not already taken place as indicated, and mixed with material of a more combustible nature, which eventually finds its way to a device of the type known as pulverized coal apparatus, which by a suitable associated device will produce a flame used to heat the material in the evaporator.

This material may also be utilized to furnish the fuel for the associated process mentioned above, which also supplies hot gases to the drying apparatus.

It has been found that the carbon dryer forms an efficient scrubber for any gases having therein vaporized or entrained chemicals. It will be obvious by referring to the diagrammatic drawings that any material scrubbed from these gases at this point will be returned with the dry carbon to the incinerating evaporator and substantially removed in the dissolving step.

Such a process will be found to be of extreme value in that in most instances the carbon recovered with small or no additions of combustible material added will be sufficient to completely evaporate the on coming liquid waste material, and that the dissolved salts and other materials recovered will constitute a clear profit.

It will be obvious that any suitable apparatus may be utilized to carry out each step and the apparatus used in each industry will necessarily vary to meet the several conditions obtaining.

I claim:

1. A process of treating waste material containing combined carbon including the steps of subjecting the material to heat, conducting off the resultant gaseous material, separating the insoluble material from the heat treated product, and contacting the gaseous material with the insoluble product.

2. A process of treating waste material containing combined carbon, including the steps of subjecting said waste material to heat of a sufficient intensity to free the combined carbon, conducting off the resulting gaseous material from the heat treatment, separating the carbon in sludge form from the heat treated product, and contacting said sludge with said gaseous material.

3. A process of treating waste material containing combined carbon which includes the steps of subjecting said material to heat, of a sufficient intensity to vaporize a portion of said waste material, conducting off the gaseous material resulting from said heat treatment containing any vaporized material, contacting said gaseous product with a portion of the heat treated product whereby the vaporized material is removed from the gaseous product by the heat treated product, and subjecting said removed vaporized material and the heat treated product to further heat, whereby the insoluble product is burned and the removed vaporized material is returned to the cycle.

4. A process of treating waste material containing combined carbon including the steps of subjecting the material to heat, conducting off the resultant gaseous material, separating the insoluble material from the heat treated product by dissolving therefrom the soluble matter, and contacting said gaseous material with the moist residual material.

5. A process of treating waste material containing combined carbon which includes the steps of freeing said carbon with the production of heated gaseous material, producing a sludge with said carbon, and contacting the heated gaseous material with said sludge.

6. A process of treating material containing combined carbon which includes the steps of subjecting said material to heat to free the carbon, conducting off the resulting gaseous material, dissolving the soluble matter from said heat treated product whereby a carbon sludge is formed, contacting said gaseous material with said sludge whereby the values in said gaseous material are removed and said carbon is substantially dried, and utilizing said substantially dry carbon containing the removed values to produce the heat in the initial step of the process whereby the carbon is burned and the values are returned to the cycle.

In testimony whereof, I affix my signature.

JOSEPH E. PLUMSTEAD.